(12) United States Patent
Klebanov

(10) Patent No.: US 7,903,696 B2
(45) Date of Patent: Mar. 8, 2011

(54) HIGH-POWER NARROWED-LINEWIDTH FIBER LASER SYSTEM

(75) Inventor: Leonid Klebanov, Westborrow, MA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 12/317,996

(22) Filed: Dec. 31, 2008

(65) Prior Publication Data

US 2010/0166026 A1 Jul. 1, 2010

(51) Int. Cl.
*H01S 3/30* (2006.01)

(52) U.S. Cl. ............. 372/6; 372/97; 372/99; 372/102; 372/108; 359/333; 359/337.21; 359/341.1

(58) Field of Classification Search ............. 372/6, 97, 372/99, 102, 108; 359/333, 337.21, 341.1
See application file for complete search history.

(56) References Cited

U.S. PATENT DOCUMENTS

| | | | |
|---|---|---|---|
| 5,422,897 A | 6/1995 | Wyatt et al. | |
| 5,774,484 A | 6/1998 | Wyatt et al. | |
| 6,018,534 A * | 1/2000 | Pan et al. | 372/6 |
| 6,788,712 B2 * | 9/2004 | Atieh | 372/6 |
| 6,975,450 B2 * | 12/2005 | Hwang et al. | 359/349 |
| 6,975,796 B2 * | 12/2005 | Kim et al. | 385/37 |
| 6,990,270 B2 * | 1/2006 | Nicholson | 385/27 |
| 7,019,892 B2 * | 3/2006 | Hwang et al. | 359/333 |
| 7,136,402 B1 * | 11/2006 | Ohtsuki | 372/22 |
| 7,221,822 B2 | 5/2007 | Grudinin et al. | |
| 7,319,707 B2 * | 1/2008 | Kim et al. | 372/6 |
| 7,764,720 B1 * | 7/2010 | Bronder et al. | 372/6 |

* cited by examiner

*Primary Examiner* — Minsun Harvey
*Assistant Examiner* — Yuanda Zhang

(57) ABSTRACT

A high-power narrow-linewidth fiber laser system includes a seed oscillator with multiple resonant cavities and an amplifier stage. The seed oscillator includes a gain fiber, a pump source to introduce pump light into the gain fiber, a single-mode output fiber arranged at the end of the active gain fiber, a first resonant cavity including the active gain fiber, and a second resonant cavity including the active gain fiber. The first and second resonant cavities cooperate to minimize the synchronization of longitudinal modes and thereby reduce modal beating. The amplifier preferably includes an active multimode gain fiber capable of supporting a single fundamental mode at the signal wavelength, wherein the single mode output fiber of the seed oscillator and the multimode gain fiber of the amplifier are mode-matched and coupled without a mode converter.

9 Claims, 12 Drawing Sheets

FIG. 3B
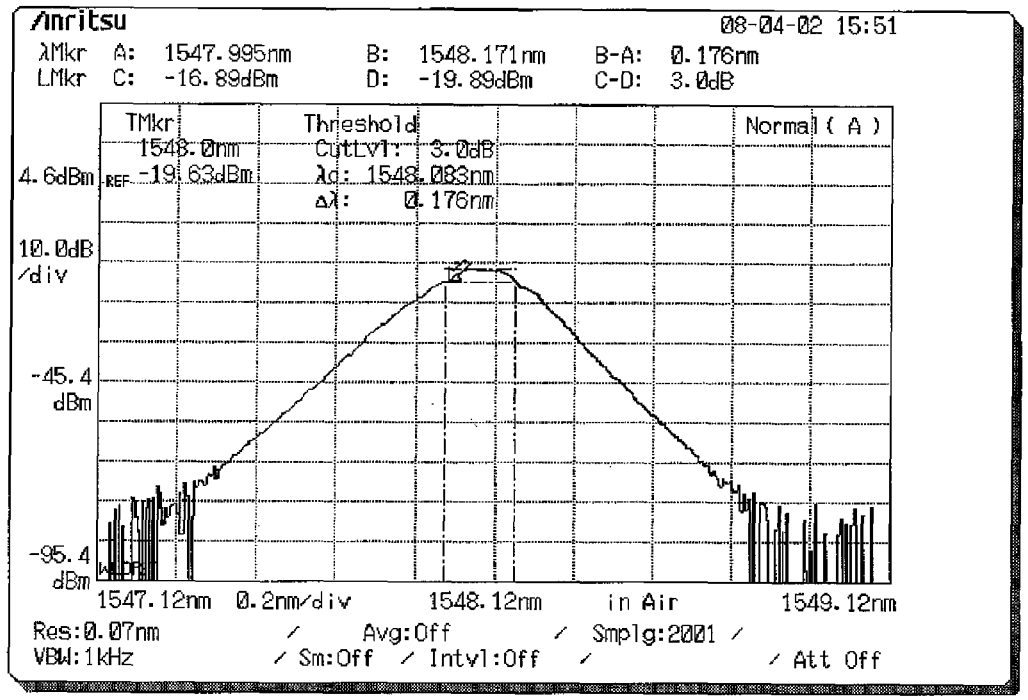
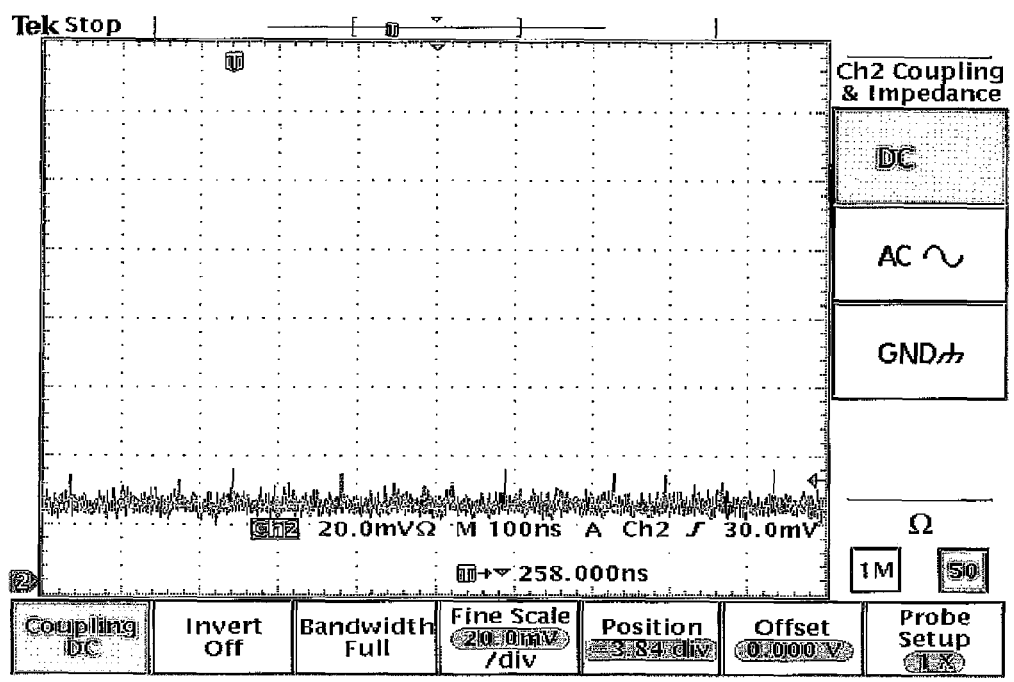
FIG. 3D

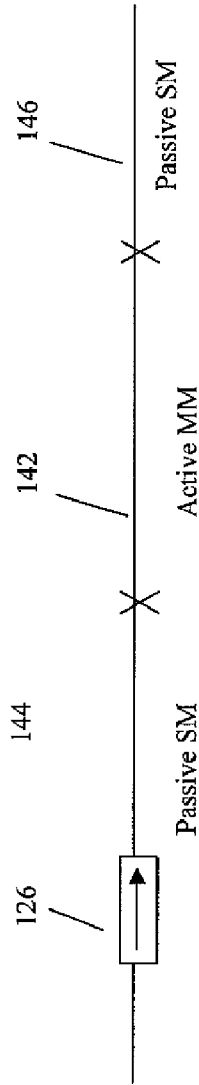
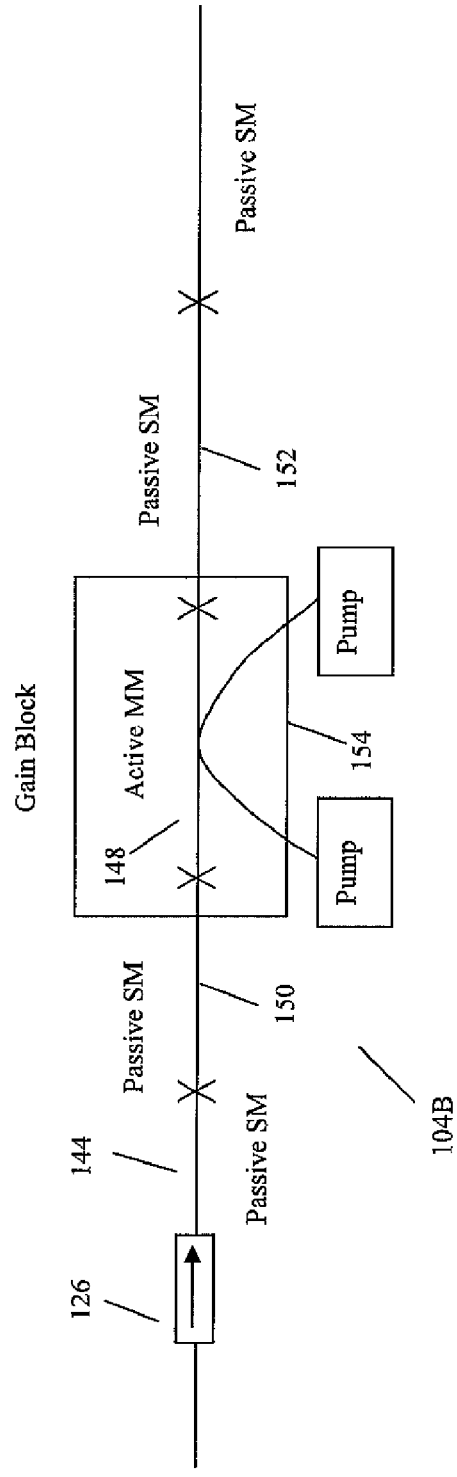
Fig. 4
Fig. 5

HIGH-POWER NARROWED-LINEWIDTH FIBER LASER SYSTEM

BACKGROUND AND SUMMARY OF THE INVENTION

The instant invention relates to fiber lasers, and more particularly to a high-power seed fiber laser oscillator having a narrowed spectral linewidth.

A number of laser applications require lasers with a narrow spectral linewidth. Further, a number of the narrow linewidth applications, such as pumping of gain media with a narrow spectral absorption line, also require high-power spectral density coupled into the media. A narrow spectral linewidth is important for example, to single frequency laser systems. The narrower the spectral linewidth, the higher the spectral density.

The term "linewidth" is applied here to describe an envelope of spectral emissions which is defined by a distribution of longitudinal modes (frequencies). Fundamentally, a laser emits a plurality of closely spaced longitudinal modes, which are centered about a particular frequency. However, at a discrete moment in time, only one of those discrete modes exists. When viewed in time, the longitudinal mode of the laser jumps from one mode to another defining an envelope of emissions. The amount of time the laser operates in one of these modes, along with a measure of intensity during that time, defines a power of the laser (power=energy/time).

One type of narrow linewidth laser is a fiber laser. A fiber laser is defined as a laser with an optical fiber as the gain media. In most cases, the gain medium is a fiber doped with rare-earth ions such as erbium, neodymium, ytterbium, thulium or praseodymium. Each of these rare-earth ions absorbs light at one wavelength and emits light at another (usually longer) wavelength. For example, erbium is usually pumped at 980 nm and emits light at 1550 nm. One or more multi-mode laser diodes are used for pumping of the doped fiber and the resonant cavity is formed by Bragg gratings written directly into the fiber of the system or by fiber loop mirrors. The result is a narrow linewidth single longitudinal mode optical signal. Simple fiber laser systems provide a very stable, narrow linewidth optical signal. However, they are somewhat limited in power.

FIG. 1A illustrates a rather typical configuration of a single-frequency fiber laser system 10 including a master oscillator or seed laser 12 and one, or more, amplifier stages (amplifier cascades) 14. This configuration is also referred to as a Master Oscillator Fiber Amplifier or MOFA configuration. In order to increase the threshold of non-linear effects downstream in the system, the seed laser 12 is configured to radiate at a relatively low-power output (only up to a few hundred milliwatts). Generally, the seed laser 12 is configured with an active gain fiber 16, a pump source 18, and a pair of reflectors 20, 22 defining an optical cavity that includes the active gain fiber 16. The active fiber is doped with erbium in the illustrated configuration and is pumped with multi-mode laser diode arrays. As noted above, the active dopant may alternatively comprise any of the known rare-earth ions. The reflector 22 is illustrated as a tunable fiber grating, but could also be configured with a regular Bragg fiber grating for a fixed wavelength. An optical isolator 24 is located on the output end of the seed laser to prevent feedback.

To increase the output of the system, the single frequency system typically includes a few amplifying stages (cascading amplifiers) 14. However, the overall increased length of the single frequency system due to the amplifying stages, is associated with the occurrence of undesirable non-linear effects, such as Brillouin scattering. Another cause for the occurrence of Brillouin scattering is an overly narrow spectral linewidth, which is also associated with the configuration as shown.

FIGS. 1B, 1C and 1D illustrate operation of the system 10 of FIG. 1A. In the illustrated example, the erbium fiber 16 is pumped by multi-mode pump diodes 18 at a pump wavelength of 975 nm. The pump light stimulates an optical emission from the erbium fiber at a wavelength of about 1548 nm.

FIG. 1B is a screen shot of the output of the system on an optical spectral analyzer (OSA) showing the dependence of the power density (power/area) (spectral emission envelope 28) from an optical frequency or wavelength. The envelope shows a fairly narrow spectral linewidth 27 centered about 154 μm. FIG. 1C is a graphical illustration of the envelope 28 of FIG. 1B, showing the discretely pulsed modes 26 that define the envelope 28. Referring to FIG. 1C, at any given moment of time, seed oscillator 12 generates a single frequency (mode) 26 oscillating between the reflectors 20, 22. As described above, the laser actually emits a plurality of closely spaced longitudinal modes 26 (only few are shown) which are centered about a particular frequency (in this case 1548 nm). When viewed in time, the emission of the laser 10 jumps from one mode 26 to another 26 defining the envelope 28, i.e. the mode 26 exists in only one frequency for only a discrete period of time, and then jumps to another mode. The OSA integrates the fluctuation of this single spectral line or mode 26 within envelope 28 and shows it graphically as in FIG. 2B.

Under certain conditions of the resonant cavity, spectral lines (modes) 26, which are close to one another in time, are "synchronized" within the cavity and produce peaks 30 of power at discrete moments in time. Looking back at the formula power=energy/time, there is more energy measured in the same period of time because of the synchronization. These peaks 30, corresponding to the respective pulses or synchronization of the modes, can be seen in the screen shot of FIG. 1D and are generally known as spectral beating. Thus, although the seed oscillator 12 has a continuous wave configuration, it effectively operates in a quasi-pulsed regime. These peaks 30 are highly undesirable in laser systems. Each peak 30 is characterized by a substantial instantaneous power surge capable of damaging fiber and fiber components and of causing the appearance of non-linear effects in amplifiers 14 at undesirably low thresholds. Accordingly, the seed laser 12 can only be operated at a power such that the periodic power surges 30 do not cross the damage threshold of the fiber and components. However, this now leads to another issue in the design of the system. The seed signal may not be strong enough that the amplifier 14 can adequately amplify the narrow spectral line 26.

Turning to FIG. 2A, it is generally known that a decrease of the amplitude of peaks 30 can be achieved by broadening of the linewidth 27 of the laser (widening of the envelope). The broader the linewidth, the smaller the power density about the desired frequency, and the lower the amplitude of peaks 30. FIG. 2A illustrates a MOFA 10 having substantially the same configuration as in FIG. 1A, but which realizes a broadening of the linewidth by employing an additional length of fiber 32 (extension loop). FIG. 2B shows a broadening of the linewidth with the same signal amplitude. FIG. 2C graphically shows that the extension loop 32 is operative for creating additional modes 26, as compared to FIG. 1C, across the envelope and generally results in fewer occurrences of "synchronization" of the modes 26. FIG. 2D shows that the system of FIG. 2A exhibits a marked reduction in both the number of peaks 30 and the amplitude of those peaks 30. However, the undesirable peaks 30 still lower the threshold for the occurrence of non-linearities in the downstream amplifiers. Further broadening of the linewidth would be possible by adding further extension loops, physically lengthening the system. However, further broadening of the linewidth reduces the spectral density at the desired frequency and reduces the effectiveness of a system that requires high spectral density at a narrow spectral absorption line.

Accordingly, there is a need for an improved fiber laser system which operates to reduce the intensity of modal beating (power peaks) without limitlessly curtailing the desired output power of the seed laser.

The instant invention provides a high-power seed fiber laser oscillator which reduces the intensity of modal beating without further broadening of the spectral line and thus permits an increase in the power of the seed laser without introducing non-linearities in the downstream amplifiers.

The instant invention accomplishes this goal by introducing at least one additional resonator cavity into the system. It is believed that the addition of a second resonator cavity (or perhaps multiple resonator cavities) increases the number of discrete longitudinal modes (frequencies), (although still centered about a central frequency) thereby decreasing the time that any one mode can exist and decreasing the chances of synchronizing any of the modes at any time within the system. The result is a reduction in the number of modal peaks and a reduction in the amplitude of the peaks that are induced.

More specifically, the high-power narrowed-linewidth fiber laser system of the present invention includes a seed oscillator with multiple resonant cavities and at least one amplifier stage. Because of the reduction in the number and amplitude of the peaks, the seed laser can be driven at a higher power, reducing the need for downstream amplifiers.

The seed oscillator includes a single mode, rare-earth doped, active gain fiber, a bi-directional pump source to introduce pump light into the active gain fiber, and a single-mode output fiber arranged at one end of the active gain fiber. A tunable fiber Bragg grating is preferably provided within the single mode output fiber followed by an optical isolator to prevent feedback from downstream amplifier stages. A 50/50 coupler is provided at the other end of the active fiber to split light from the active gain fiber into first and second branches, which form the two separate resonant cavities. Each of the branches from the coupler is terminated with a fiber loop mirror. Accordingly, a first resonant cavity including the active gain fiber is formed between the output Bragg grating and the fiber loop mirror on the first branch, and a second resonant cavity including the active gain fiber is formed between the output Bragg grating and the fiber loop mirror on the second branch. The first resonant cavity also includes an extension loop so that the resonant cavities have different optical lengths. The second resonant cavity creates a different set of longitudinal modes, although still centered about the same frequency, and thus minimizes the synchronization of all modes within the system to thereby reduce non-linear effects prior to amplification.

The amplifier stage(s) can comprise any known amplification system, but preferably within the context of the invention, the amplifier stage includes an active multimode gain fiber capable of supporting a substantially single fundamental mode at the signal wavelength, wherein the single mode output fiber of the seed oscillator and the multimode gain fiber of the amplifier are mode-matched and coupled without a mode converter.

Accordingly, among the objects of the instant invention are:

the provision of an improved high-power seed fiber laser oscillator which reduces the intensity of modal beating without further broadening of the spectral linewidth;

the provision of an improved seed fiber laser which permits an increase in the power of the seed laser without introducing non-linearities in the downstream amplifiers;

the provision of an improved seed fiber laser which introduces at least one additional resonator cavity into the system to increase the number of longitudinal modes within the spectral distribution envelope; and the provision of such an improved seed fiber laser which minimizes the occurrence of synchronization of the longitudinal modes, resulting in a reduction in the number of modal peaks and a reduction in the amplitude of the peaks that are induced.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3B is a screen shot of the spectral linewidth (envelope) of the optical signal generated by the MOFA of FIG. 3A, as seen on an OSA;

FIG. 3D is an graphical illustration of the spectral noise of the MOFA of FIG. 3A as seen on an optical spectral analyzer (OSA);

FIG. 4 is a schematic diagram of an amplifier in accordance with the teachings of the present invention; and FIG. 5 is a schematic diagram of another embodiment of an amplifier gain block in accordance with the teachings of the present invention.

DESCRIPTION OF THE PREFERRED EMBODIMENT

Figure 3A:
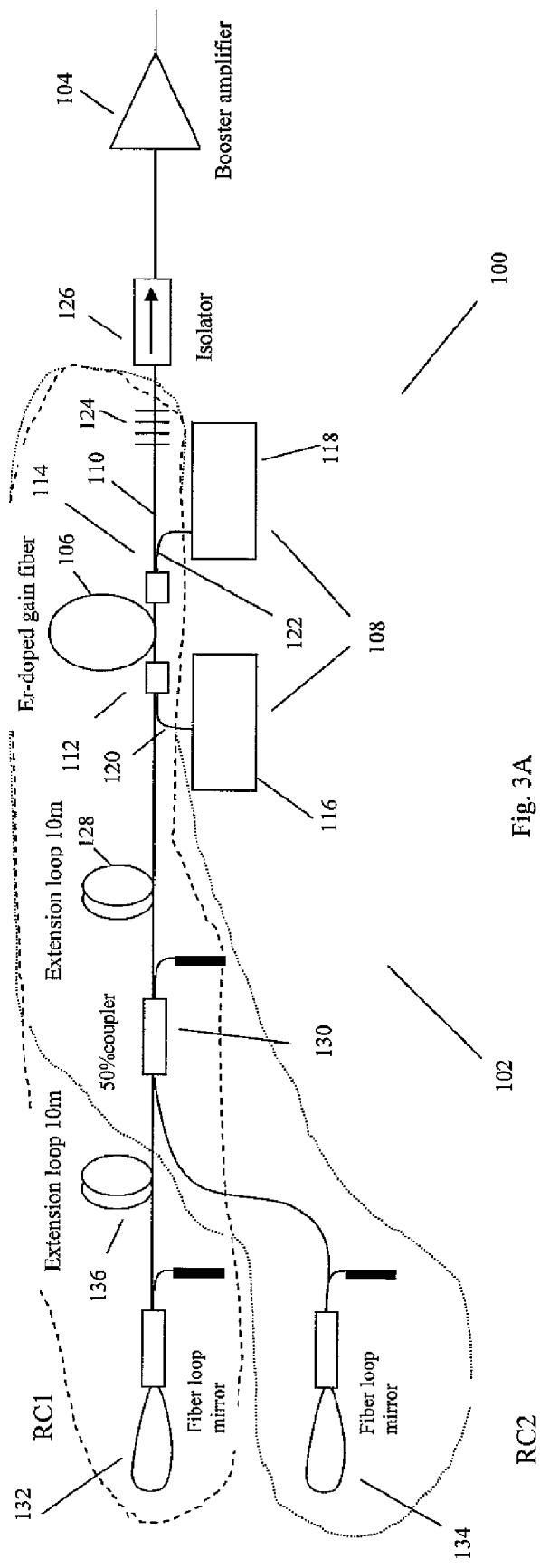
FIG. 3A is a schematic diagram of the master oscillator fiber amplifier (MOFA) in accordance with the teachings of the present invention.

Referring now to the drawings, the high-power, narrowed-linewidth fiber laser system of the instant invention is illustrated and generally indicated at 100 in FIG. 3A. As will hereinafter be more fully described, the instant fiber system 100 provides a high-power seed fiber laser oscillator which reduces the intensity of modal beating without further broadening of the spectral line, and thus permits an increase in the power of the seed laser without introducing non-linearities in the downstream fiber systems or amplifiers.

Generally, the instant invention accomplishes this goal by introducing at least one additional resonator cavity into the system. It is believed that the addition of a second resonator cavity (or perhaps multiple resonator cavities) increases the number of discrete longitudinal modes (frequencies), (although still centered about a central frequency) thereby decreasing the time that any one mode can exist and decreasing the chances of synchronizing any of the modes at any time within the system. The result is a reduction in the number of modal peaks and a significant reduction in the amplitude of the peaks that are induced.

More specifically, the high-power narrow-linewidth fiber laser system 100 includes a seed oscillator generally indicated at 102 and a downstream active fiber stage generally indicated at 104, which can comprise a fiber laser system or an amplifier stage. As will be explained in detail below, the seed oscillator 102 includes at least two resonant cavities.

The seed oscillator 102 includes a single mode, rare-earth doped, active gain fiber generally indicated at 106, a bi-directional pump source generally indicated at 108 to introduce pump light into the active gain fiber 106 and a single-mode output fiber 110 arranged at one end of the active gain fiber 106.

In the illustrated embodiment, the active gain fiber 106 is a single mode fiber, doped with erbium to produce a stimulated emission in the 1550 nm optical window. Each end of the active gain fiber 106 is terminated with an optical Y-coupler 112,114 to provide for the introduction of bi-directional pump light into the fiber 106.

The pump source 108 preferably comprises two separate multi-mode diode arrays 116,118 each having a fiber pigtail spliced to a respective one of the couplers 112,114. For purposes of the present invention, the specific arrangement of the pump source 108, and the manner of coupling the diode arrays 116,118 to the input fibers 120,122 is not critical to the invention. However, for the sake of completeness, the applicants incorporate by reference, the teachings of U.S. Pat. No. 7,221,822 which describes a variety of different pumping schemes. Nevertheless, this disclosure of pumping schemes is not intended to be limiting, but is rather just an example of the variety of pumping arrangements that may be possible.

Furthermore, while the illustrated embodiment 100 is identified as an erbium doped system operating in the 1550 nm optical window, it is to be understood that the principles of the present invention are equally applicable to all rare-earth doped fiber systems, including, but not limited to those systems based on neodymium, ytterbium, thulium or praseodymium. Modifications of the pump source 108 are of course necessary to provide the appropriate pump source for these other systems. However, these modifications are well within the knowledge of those skilled in the art, and an explanation of the specific requirements of such systems is not believed to be necessary within the context of the present specification.

The output end of the resonant cavities is formed by a tunable fiber Bragg grating 124 that is preferably provided within the single mode output fiber followed by an optical isolator 126 to prevent feedback from any downstream fiber stages 114 (to be described hereinbelow). It is also noted that the tunable fiber grating may also comprise a fixed fiber grating (DBR) operative for a single frequency.

Figure 2A:
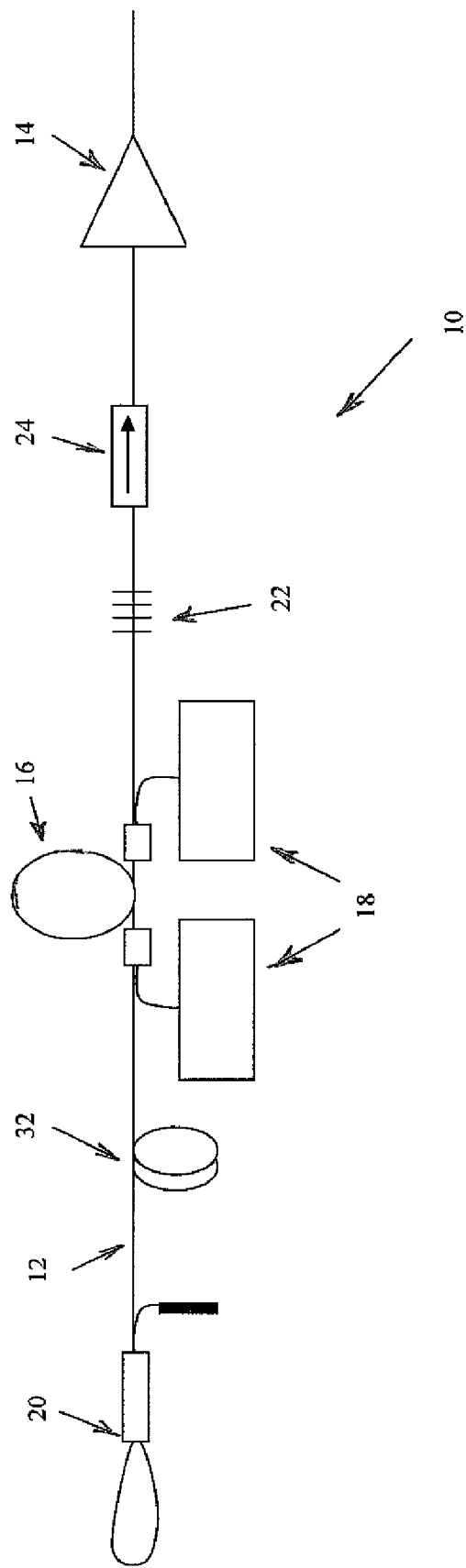
FIG. 2A is a schematic diagram of a second prior art master oscillator fiber amplifier (MOFA) including an additional fiber segment.
Figure 2B:
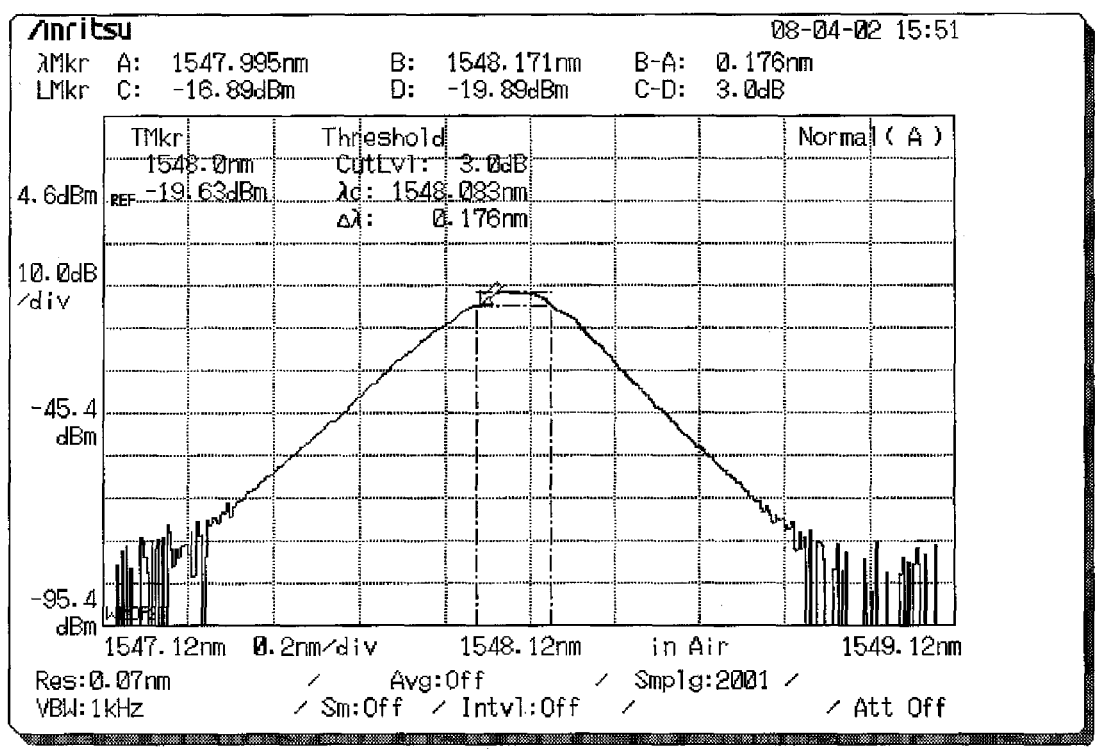
FIG. 2B is a screen shot of the spectral linewidth (envelope) of the optical signal generated by the MOFA of FIG. 2A, as seen on an OSA.
Figure 2C:
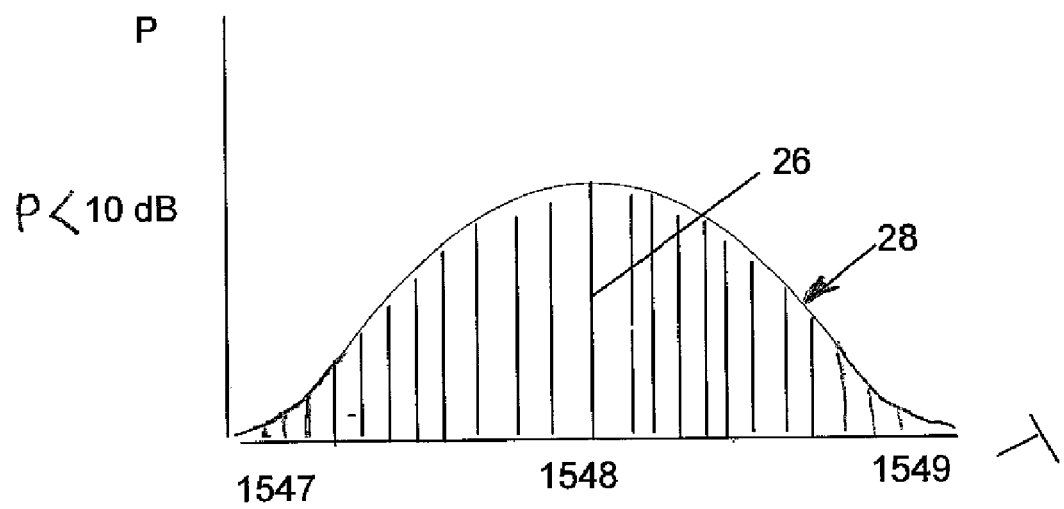
FIG. 2C is a graphical depiction of the envelope illustrating the plurality of discrete longitudinal modes defining the envelope.
Figure 2D:
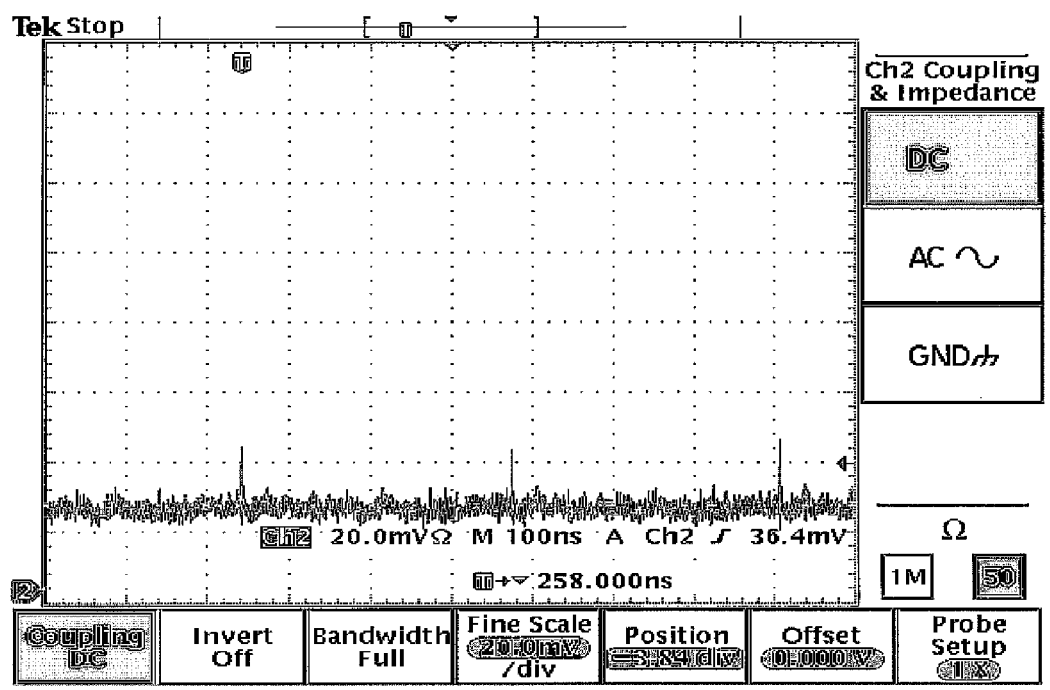
FIG. 2D is an graphical illustration of the spectral noise of the MOFA of FIG. 2A as seen on an optical spectral analyzer (OSA) and illustrating modal peaks.

The remaining branch of coupler 112 is provided with a length of single mode fiber forming an extension loop 128, as taught in the prior art of FIG. 2A. The extension loop 128 lengthens the resonant cavities and provides some reduction in both the number of modal peaks and the amplitude of those peaks as shown in FIGS. 2A-D. The length of the extension loop 128 is identified as 10 meters. However, the length can be varied to accommodate specific needs and output.

A 50/50 coupler 130 is provided at the other end of the extension loop 128 to split light from the active gain fiber 106 into first and second branches, which will form the two separate resonant cavities. Each of the branches from the coupler 130 is terminated with a fiber loop mirror 132,134. It is noted, that other types of mirror or reflectors are also suitable within the scope of the invention. Accordingly, a first resonant cavity including the active gain fiber 106 is formed between the output Bragg grating 124 and the fiber loop mirror 132 on the first branch (identified as RC1 in drawing FIG. 3A), and a second resonant cavity including the active gain fiber 106 is formed between the output Bragg grating 124 and the fiber loop mirror 134 on the second branch (identified as RC2 in drawing FIG. 3A). The first resonator cavity RC1 also includes an additional extension loop 136 so that the resonant cavities RC1 and RC2 have different optical lengths. The length of the extension loop 136 is identified as 10 meters. However, the length can be varied to accommodate specific needs and output.

Figure 3C:
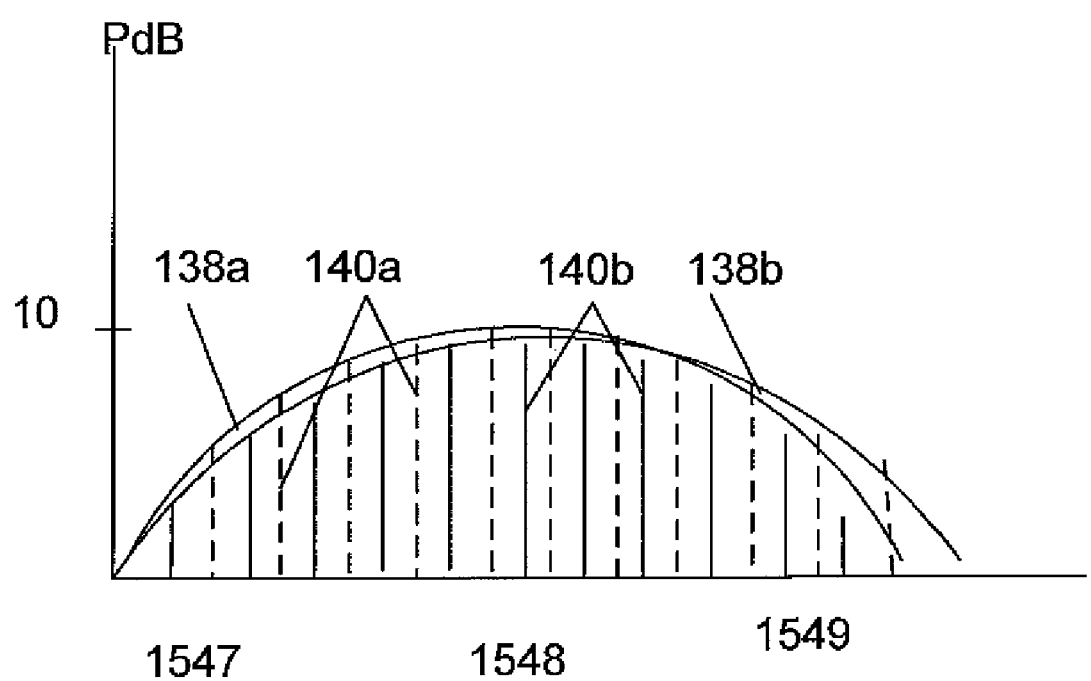
FIG. 3C is a graphical depiction of the two overlapping envelopes created by the resonant cavities and illustrating the plurality of discrete longitudinal modes defining the envelopes.

Turning now to the operation of the seed oscillator, FIGS. 3B, 3C and 3D illustrate the operation of MOFA 100. FIG. 3B is a screen shot of the output of the system on an optical spectral analyzer (OSA) showing the dependence of the power density (power/area) (spectral emission envelope 138) from an optical frequency or wavelength. The spectral envelope 138 maintains a fairly narrow spectral linewidth 140 centered about 1548 nm, which is desired for the present system.

Figure 1A:
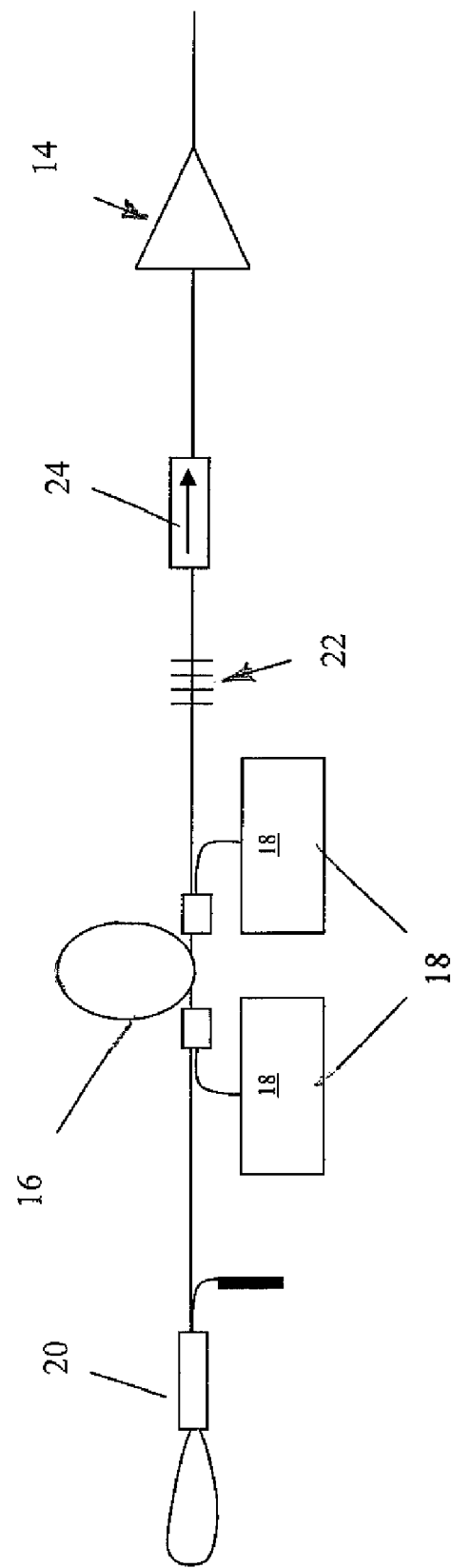
FIG. 1A is a schematic diagram of a prior art master oscillator fiber amplifier (NOFA) configuration.
Figure 1B:
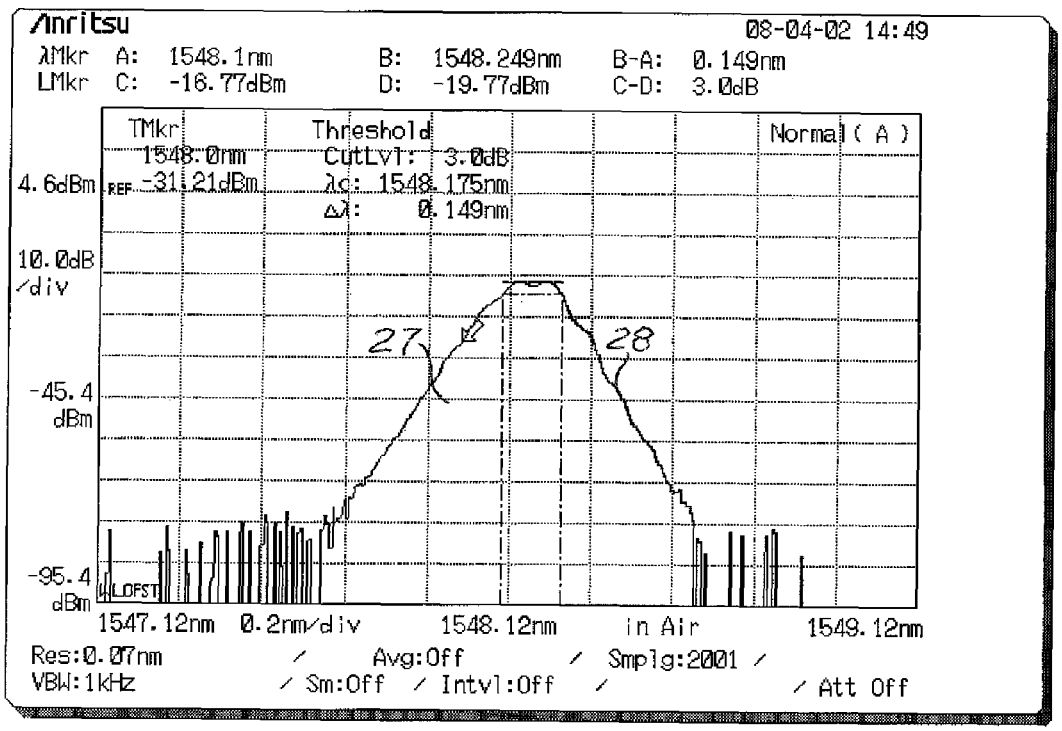
FIG. 1B is a screen shot of the spectral linewidth (envelope) of the optical signal generated by the MOFA of FIG. 1A, as seen on an OSA.
Figure 1C:
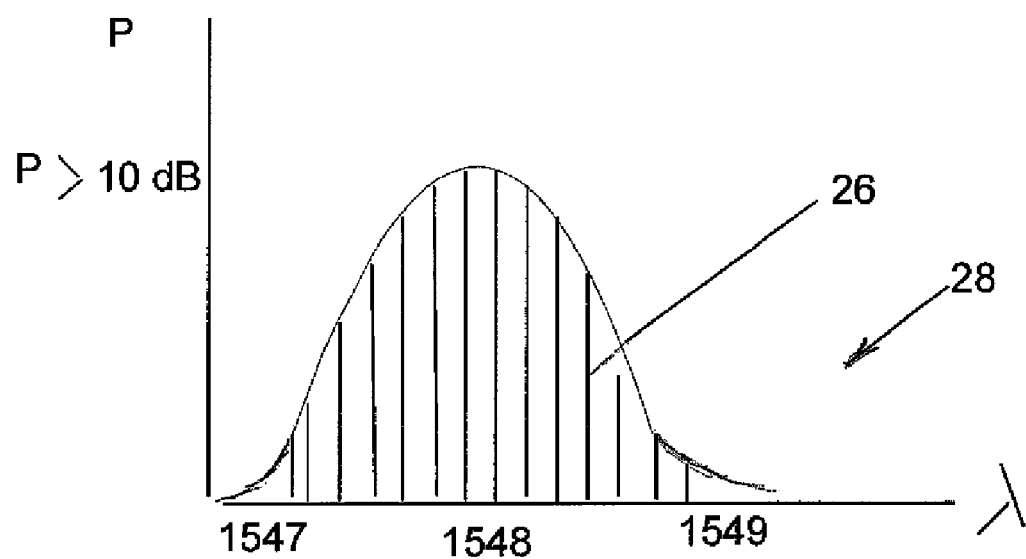
FIG. 1C is a graphical depiction of the envelope illustrating the plurality of discrete longitudinal modes defining the envelope.
Figure 1D:
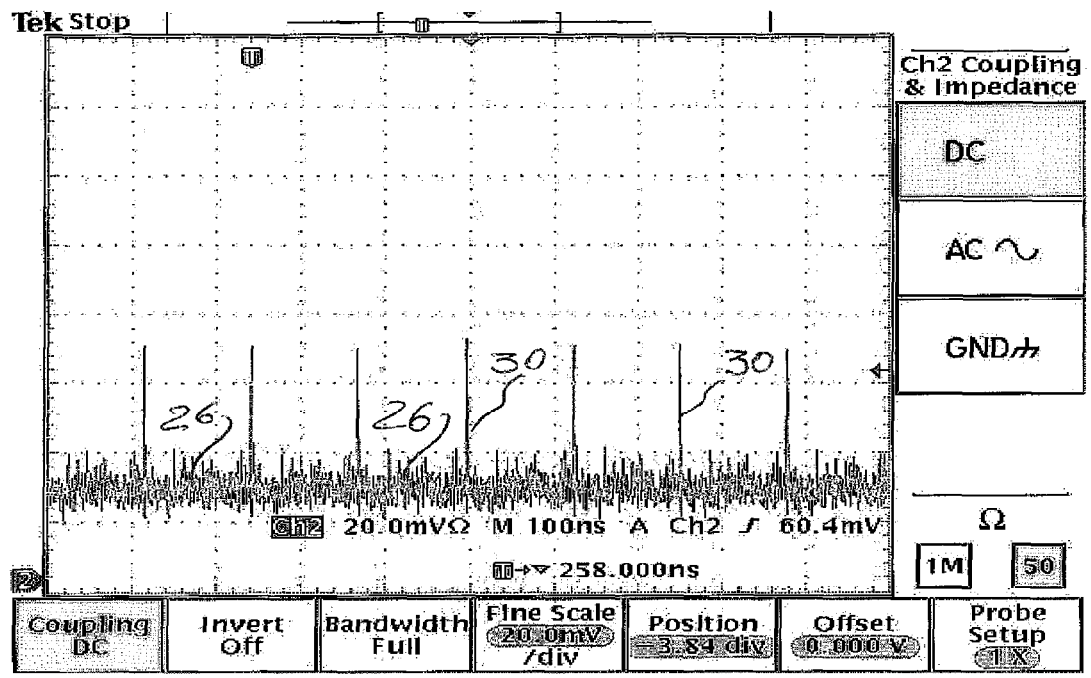
FIG. 1D is screen shot of the optical intensity of the MOFA of FIG. 1A as seen on an optical spectral analyzer (OSA) and illustrating modal peaks.

As explained above, the addition of a second resonator cavity RC2 increases the number of longitudinal modes generated in the system 102. Turning to FIG. 3C, it is thought that the first and second resonant cavities RC1 and RC2 create different sets of longitudinal modes (envelope 138a and 138b), although still centered about the same frequency. The creation of these additional longitudinal modes thus minimizes the synchronization of all modes within the system to thereby reduce the occurrences of modal beating. Turning to FIG. 3D, in comparison with the illustrations of FIGS. 1D and 2D of the prior art, FIG. 3D clearly shows that the configuration of the present invention provides a significant reduction of the intensity of the peaks 142.

Although not specifically illustrated in the drawing figures, the scope of the invention further encompasses the use of additional resonant cavities, such as for example, 3 or 4 cavities, or perhaps more.

The single mode output of the seed oscillator 102 can then used as an optical source for another wavelength fiber laser 104A (FIG. 4) or can be further amplified in one or more amplifier stages 104B (FIG. 5) coupled to the output of the isolator 126.

The downstream fiber stage 104 can comprise any known fiber or amplification system, but preferably within the context of the invention, stage 104 includes an active multimode gain fiber capable of supporting a single fundamental mode at the signal wavelength, wherein the single mode output fiber of the seed oscillator and the multimode gain fiber of the amplifier are mode-matched and coupled without a mode converter. Examples of prior art multi-mode active fiber schemes are shown and described in U.S. Pat. Nos. 5,422,897 and 5,774,484, the entire contents of which are incorporated by reference herein.

Turning to FIG. 4, there is shown a fiber laser arrangement 104A with a multimode active gain fiber 142 having an input end spliced to the passive single mode output fiber 144 from the isolator 126. The output end of the fiber 142 is spliced to another single mode fiber 146 to ultimately provide a high-power single mode output. In this regard, the output of the seed oscillator 102 operates as a pump source for the active multi-mode fiber 142. An example of such a fiber system is illustrated in FIG. 1 of U.S. Pat. No. 5,422,897. In such an example, the seed oscillator 102 may comprise a ytterbium based laser, pumped at 915 nm, and emitting at 980 nm, while the multimode active fiber 142 in the amplifier/laser stage 114A is an erbium doped active fiber, ultimately emitting in the 1550 nm optical window.

Referring now to FIG. 5 there is shown a more traditional amplifier gain block 104B, including a multi-mode active gain fiber 148 spliced at the input end with a single-mode fiber 150 and at the output end with a single mode fiber 152. The single mode input fiber 150 is spliced to the single mode output fiber 144 of the isolator 126.

The active multi-mode gain fiber 148 is pumped with a conventional bi-directional pump scheme 154, such as multi-mode laser diode arrays, other pump schemes. Such a gain block 104B could comprise a conventional erbium doped fiber amplifier, wherein the 1550 nm signal from the seed oscillator is being further amplified. Other rare-earth amplifier systems are also contemplated within the scope of the invention.

It can therefore be seen that the instant invention provides an improved high-power seed fiber laser oscillator which reduces the intensity of modal beating without further broadening of the spectral line. The invention further provides an improved seed fiber laser which permits an increase in the power of the seed laser without introducing non-linearities in the downstream amplifiers. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fiber laser system operative to emit a light signal within a predetermined narrow linewidth, the fiber laser system comprising:
   an active fiber;
   a plurality of upstream passive fibers having respective inner ends operatively connected to one of opposite ends of the active fiber;
   an output passive fiber having an upstream end, which is coupled to an other end of the active fiber, and a downstream end outputting the light signal;
   multiple strong reflectors in respective upstream fibers and a weak reflector in the output fiber, the strong reflectors and the weak reflector defining respective resonators therebetween of different lengths each supporting longitudinal modes of the light signal, the longitudinal modes circulating in respective resonators being combined together so that the longitudinal modes of one resonator are spectrally offset from those of an other resonator, wherein the intensity of mode beating among the combined longitudinal modes is minimized.

2. The fiber laser system of claim 1, wherein the plurality of strong reflectors each are a fiber loop mirror, the weak reflector being a Bragg grating.

3. The fiber laser system of claim 1 further comprising a coupler providing an interface between the inner ends of the upstream passive fibers and the one end of the active fiber.

4. The fiber laser system of claim 2, wherein the weak reflector includes a tunable fiber Brag grating.

5. The fiber laser system of claim 1, wherein the plurality of upstream passive fibers, active fiber and output passive fiber define an oscillator.

6. The fiber laser system of claim 5 further comprising at least one fiber amplifier configured with an active fiber and upstream and output passive fibers which are operatively connected to respective ends of the active fiber of the fiber amplifier, the upstream passive fiber of the amplifier and output passive fiber of the oscillator being operatively connected to one another so that the light signal is coupled into the upstream passive fiber of the amplifier without losses.

7. The fiber laser system of claim 6 further comprising a plurality of pump source each configured to introduce pump light into the active fiber.

8. The fiber laser system of claim 6, wherein the passive and active fibers are configured with substantially identical mode filed diameters to minimize losses of the light signal.

9. The fiber laser of claim 6, wherein the upstream and output passive fibers of the respective oscillator and amplifier are single mode fibers.

* * * * *